United States Patent [19]

Muraoka et al.

[11] Patent Number: 5,581,745

[45] Date of Patent: Dec. 3, 1996

[54] APPARATUS FOR SUSPENDING THE BUS CYCLE OF A MICROPROCESSOR BY INSERTING WAIT STATES

[75] Inventors: Hiroshi Muraoka, Kawasaki; Kiminori Fujisaku, Sagamihara, both of Japan

[73] Assignee: Fujitsu Limited, Kawasaki, Japan

[21] Appl. No.: 168,392

[22] Filed: Dec. 17, 1993

Related U.S. Application Data

[63] Continuation of Ser. No. 640,454, Jan. 11, 1991, abandoned.

[30] Foreign Application Priority Data

Jan. 12, 1990 [JP] Japan .................................. 2-005342

[51] Int. Cl.$^6$ .............................................. G06F 13/00
[52] U.S. Cl. .......................... 395/557; 395/494; 395/879
[58] Field of Search ............................ 340/825.5, 825.51; 370/85.6; 395/200, 275, 325, 375, 425, 550, 725, 494, 878, 879

[56] References Cited

U.S. PATENT DOCUMENTS

| | | | |
|---|---|---|---|
| 3,964,054 | 6/1976 | Annunzita et al. | 395/449 |
| 4,050,096 | 9/1977 | Bennett et al. | 395/494 |
| 4,153,941 | 5/1979 | Capoew | 395/550 |
| 4,271,468 | 6/1981 | Christensen et al. | 395/859 |
| 4,282,572 | 8/1981 | Moore, III et al. | 395/478 |
| 4,488,217 | 12/1984 | Binder et al. | 395/375 |
| 4,507,732 | 3/1985 | Catiller et al. | 395/879 |
| 4,509,120 | 4/1985 | Daudelin | 395/550 |
| 4,620,278 | 10/1986 | Ellsworth | 395/299 |
| 4,630,041 | 12/1986 | Casamatta et al. | 340/825.5 |
| 4,692,895 | 9/1987 | Huffman | 395/550 |
| 4,818,985 | 4/1989 | Ingda | 340/825.5 |
| 4,835,728 | 5/1989 | Si et al. | 395/550 |
| 4,918,599 | 4/1990 | Hashimoto et al. | 395/738 |
| 5,047,921 | 10/1991 | Kinter et al. | 395/50 |
| 5,125,088 | 6/1992 | Culley | 395/550 |
| 5,150,467 | 9/1992 | Hayes et al. | 395/287 |
| 5,151,979 | 9/1992 | Posritt | 395/550 |
| 5,151,986 | 9/1992 | Langan et al. | 395/550 |
| 5,155,812 | 10/1992 | Ehlig et al. | 395/879 |
| 5,175,829 | 12/1992 | Stumpf et al. | 395/375 |
| 5,185,865 | 2/1993 | Pugh | 395/500 |

FOREIGN PATENT DOCUMENTS

0386935 9/1990 European Pat. Off. .
WO89/02128 3/1989 WIPO .

Primary Examiner—Lance Leonard Barry, Esq.
Attorney, Agent, or Firm—Armstrong, Westerman, Hattori, McLeland & Naughton

[57] ABSTRACT

An interrupt request processing device and method for control of the bus cycle of a microprocessor which implements predetermined wait periods dependent upon a detected wait request. Predetermined wait states, programmable in the microprocessor, are assigned to wait request signals for implementation of a predetermined wait period corresponding to a detected wait request signal, in which the bus cycle is suspended for the predetermined wait period while the signal to be applied to the connected peripheral device is held during access to the peripheral device. After the predetermined wait period is over the bus cycle is unsuspended and the microprocessor is again able to detect wait request signals.

6 Claims, 10 Drawing Sheets

APPARATUS FOR SUSPENDING THE BUS CYCLE OF A MICROPROCESSOR BY INSERTING WAIT STATES

This application is a continuation of application Ser. No. 07/640,454 filed Jan. 11, 1991, now abandoned.

BACKGROUND OF THE INVENTION

This invention pertains to a microcomputer and a method for controlling its bus cycle, and in particular, to a microcomputer and a bus cycle control method with an improved wait control of the bus cycle.

DESCRIPTION OF THE RELATED ART

With recent advances in the microcomputer field, demand for improved functions has necessarily increased. Various special chips, Large Scale Integration packages (LSIs), for executing particular functions normally performed by a Central Processing Unit (CPU) or microprocessor, have been developed as peripheral devices to CPUs. Microprocessors for controlling peripheral devices need to have a wait state inserted into their bus cycle to make their speed correspond with that of low-speed peripheral devices.

To cope with lower-speed peripheral devices, a conventional microcomputer samples input signals from the wait request input terminal of its microprocessor in a predetermined cycle. If the sampled signal indicates a wait instruction, one wait state is inserted into the current bus cycle. If the wait request signal sampled in a wait state indicates a wait instruction, one wait state is inserted into the next bus cycle. By repeating this process, a plurality of wait states are inserted into the bus cycle.

However, in such a conventional microcomputer, except for an address decoding circuit for selecting the address of a wait request, an external circuit separate from the microprocessor must perform a time control from the beginning of the wait request to its clearing. Thus, a complex configuration due to a large number of poorly designed external circuits becomes more probable. Increased design cost is necessary to prevent this from occurring.

The external circuit needs a counter for counting the number of wait states for the time control from the beginning of the wait request to its clearing, and the period of time proportionate to the requested number of wait states must be measured. Further, the counter has to be initialized at the beginning of the wait request. Count-ups or count-downs proportionate to the bus cycle of the microprocessor are performed, and when the counter reaches a predetermined value, a signal indicating a wait request clearing needs to be outputted to the microprocessor. Further, the wait request/clearing signal must be outputted to the microprocessor at a timing requested by the microprocessor. This makes the configuration of the external circuit more complex, thus increasing the cost. When the wait request/clearing timing determined by the microprocessor becomes more complex, a failure in the external circuit's design becomes more probable.

Some microprocessors are loaded with so-called automatic wait control functions. To cope with a lower-speed peripheral device, such a microprocessor performs the bus cycle wait automatically without requiring a wait request input terminal by using a programmably set wait address setting register, a corresponding number of wait states setting register, a wait address judging circuit for judging by comparison whether or not the address outputted from the microprocessor is set in the wait address setting register, and a control circuit for inserting, in the present bus cycle, wait states whose number is equal to that of the wait states provided in the corresponding number of wait states setting registers when an address is judged to be caused to wait.

However, such a microprocessor must include each of the above registers, a judging circuit and a control circuit. Accordingly, there is a problem that an extremely large circuit is required for the wait control of the microprocessor. If the wait control of the microprocessor is thus configured, the microprocessor must necessarily output a chip-select signal, and there is a disadvantage that the microprocessor must contain a very large number of circuits and terminals. This is because, unless the microprocessor outputs a chip-select signal, in many cases an external circuit needs to create one and the external circuit must be equipped with a chip-select signal-creating circuit almost identical to the wait address judging circuit.

Therefore, not even microprocessors loaded with automatic wait control functions can solve the above problems.

SUMMARY OF THE INVENTION

This invention aims at providing a microcomputer and a bus cycle control method that enables an automatic wait control of a microcomputer at a low cost, without significantly increasing the size of either the microprocessor's internal circuit or its external circuit necessary for a wait control.

To attain the above goals, the microcomputer and the bus cycle control method of this invention is configured as follows.

In the invention according to claim 1, a microprocessor performs an ordinary operation processing at a predetermined bus cycle. When a wait trigger condition of the wait request signal inputted from the wait request signal creating unit arranged outside the microprocessor is detected, regardless of the input level of the following wait request signal, the bus cycle in the microprocessor is caused to wait for a period corresponding to the predetermined state number, during which period the microprocessor and the peripheral devices are accessed. After this period has elapsed, the wait is cleared, the original bus cycle is reinstated, and detection of a wait trigger condition of the wait request signal again becomes possible.

The invention according to claim 2 includes a microprocessor for a processing operation at a predetermined bus cycle and a peripheral device accessible with the microprocessor. When the microprocessor accesses a peripheral device in the microcomputer that causes the bus cycle of the microprocessor to wait, the microprocessor is configured to include a main control part for control processing an operation and for generating an access signal to the peripheral device, a state number setting unit for programmably setting the state number to be caused to wait, and a wait instruction signal generating unit for generating a wait instruction signal in response to a wait request signal. A wait request signal forming means is provided at the outside of the microprocessor. When the microprocessor detects the wait trigger condition of the wait request signal creating means, it causes the bus cycle in the main control part to wait for a period corresponding to the state number set by the state number setting means by outputting the wait request signal from the wait instruction signal generating means. During this wait period, the microprocessor and the peripheral devices are accessed. After this period has elapsed, a detection of the wait trigger condition of the wait request signal again becomes possible.

The invention according to claim 3 includes pluralities of state number setting means, wait instruction signal generating means and a wait request signal creating means. The wait request signal creating means output the results to the corresponding wait instruction signal generating unit, and output to the main control part the OR logical product of the wait request signal outputted from each wait instruction signal generating means.

In the invention according to claim 4, a microprocessor performs an ordinary operation processing by a predetermined bus cycle. When a peripheral device arranged outside of the microprocessor is accessed, a signal that chip-selects the peripheral device by an address is commonly used as a wait signal. When the microprocessor outputs a chip-select signal to its peripheral device, an address selector detects it as a wait request signal. When the wait request signal is detected, the bus cycle in the microprocessor is caused to wait for a period corresponding to the predetermined state number. During this wait period, an access between the microprocessor and the peripheral device is performed. After a certain period has elapsed, the wait is cleared and the original bus cycle is reinstated.

The invention according to claim 5 includes a microprocessor for processing an operation at a predetermined bus cycle and a peripheral device accessible by the microprocessor. When the peripheral device is accessed, the microprocessor whose microcomputer causes its bus cycle to wait, comprises a main control part for processing operation and for creating an access control signal of the peripheral device, a state number setting means for programmably setting the state number caused to wait, and a wait instruction signal generating means for generating a wait instruction signal in correspondence with the wait request signal. When the peripheral device arranged outside the microprocessor is accessed, a signal that chip-selects the peripheral device with the address is commonly used as the wait request signal. When the main control part outputs the chip-select signal to the peripheral device, the address selector provided outside the microprocessor detects it as a wait request signal. When the wait request signal is detected, the wait instruction signal generating means outputs a wait instruction signal to the main control part, and causes the bus cycle in the main control part to wait for a period corresponding to the state number set by the state number setting means. During this period, the main control part and the peripheral device are accessed.

The invention according to claim 6 includes pluralities of peripheral devices, the state number setting means, the wait instruction signal generating means and address selectors. The address selectors individually detect chip-select signals outputted from the main control part in correspondence with each of the plurality of peripheral devices as wait request signals, output the result to the corresponding wait instruction signal generating means, and output to the main control part a wait instruction signal by obtaining the "OR" logical product of each wait instruction signal generating means.

In the invention according to claim 7, when a plurality of peripheral devices simultaneously generate wait requests to the main control part, the wait request from the peripheral device with the largest number of wait states in the related state number setting means is prioritized.

In this invention, when the main control part requests an access to its peripheral device, it is detected as a trigger condition of the wait request signal (e.g., a chip-select signal of the peripheral device can be commonly used as the wait request signal), and is sent to the wait instruction signal generating unit. Then, a wait instruction signal generating unit outputs a wait instruction signal to the main control part so that the bus cycle in the main control part is caused to wait for a period corresponding to the state number set by the state number setting means. During this period, the main control part and its peripheral device are accessed. After this period has elapsed, the wait is cleared and the original bus cycle is reinstated.

Therefore, the mechanism for generating a wait request signal can be configured simply, for example, by an address decoder and a timing for a wait request/clearing becomes unnecessary. As a result, an automatic wait control of the microprocessor is realized, in which both the external circuits and the microprocessor's internal circuits necessary for the wait control are greatly simplified.

BRIEF DESCRIPTION OF THE DRAWINGS

FIGS. 2 and 3 show the microcomputer and illustrate the bus cycle control method according to the first embodiment of this invention.

FIGS. 5 and 6 show the microcomputer and illustrate the bus cycle control method according to the third embodiment of this invention.

DESCRIPTION OF THE PREFERRED EMBODIMENTS

Figure 1A:
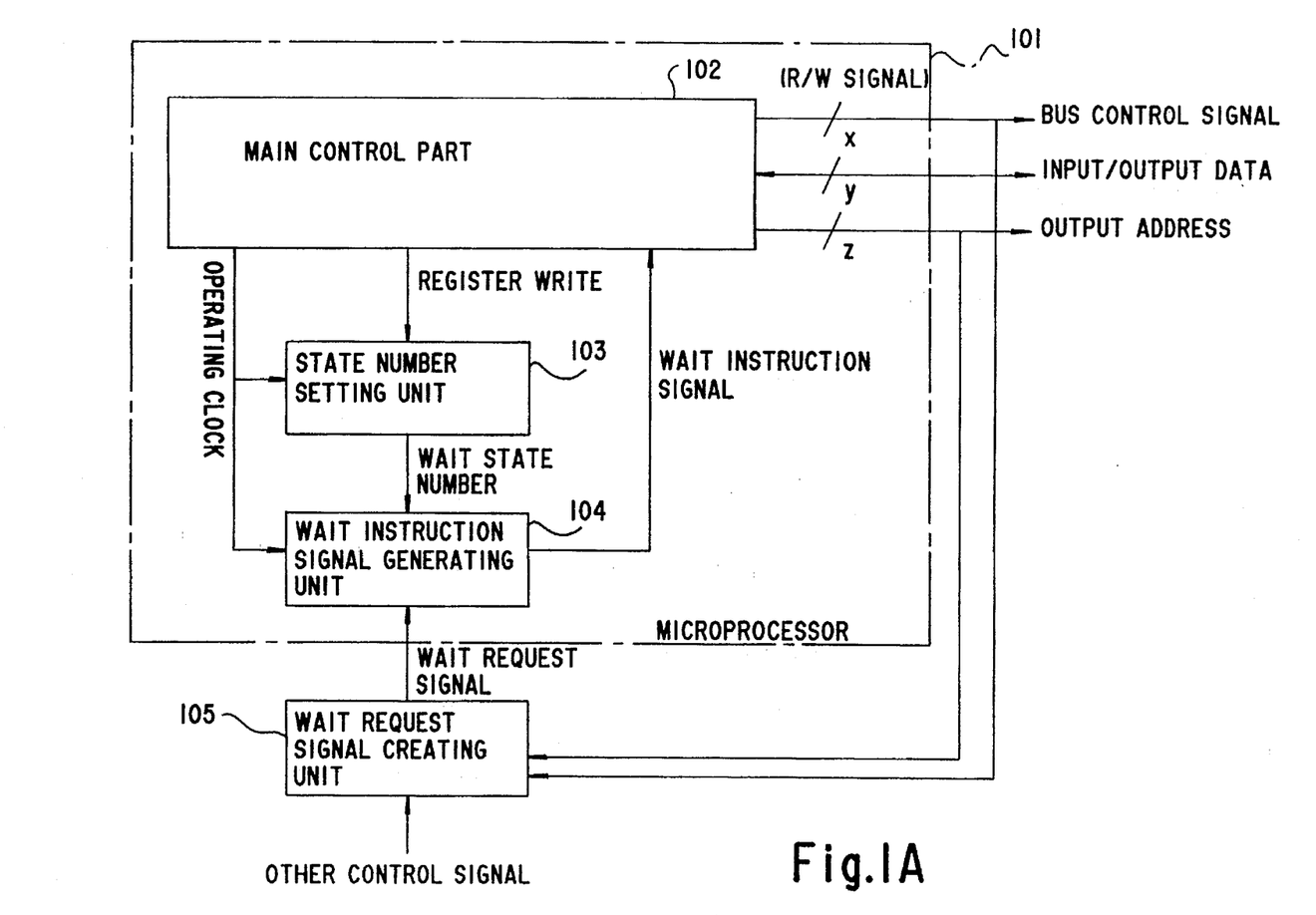
FIGS. 1A, 1B and 1C are circuit diagrams for explaining the principle of this invention.
Figure 1B:
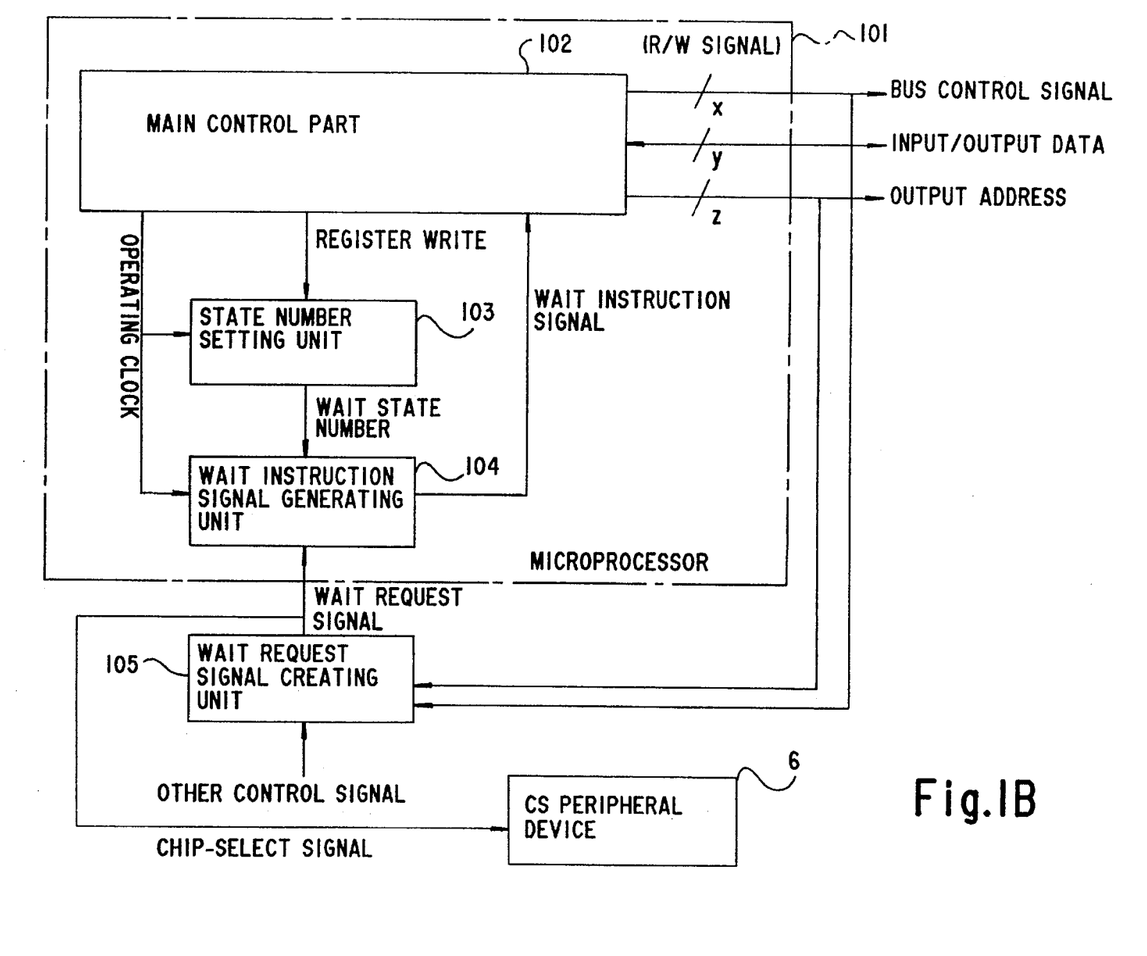
Figure 1C:
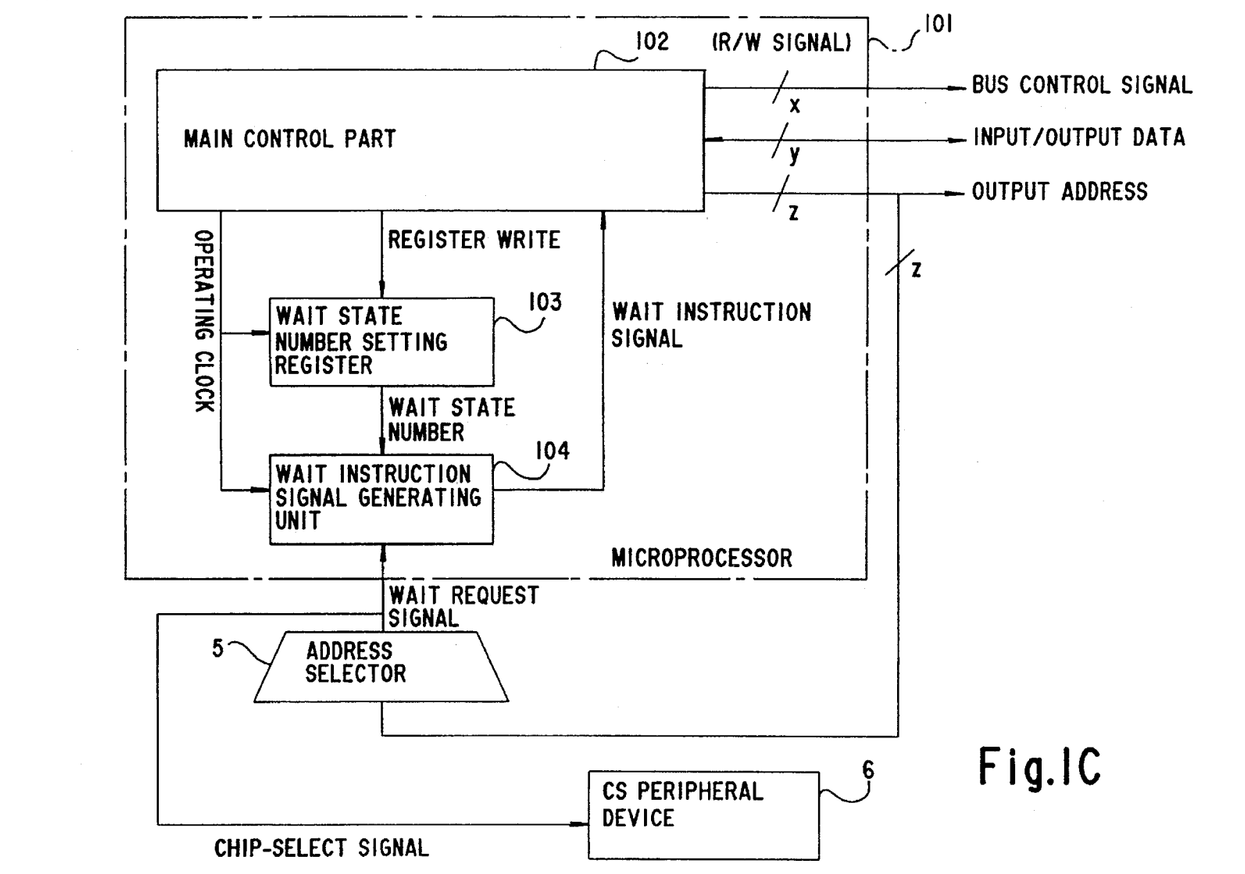

FIGS. 1A, 1B and 1C are circuit diagrams for explaining the principle of this invention.

FIG. 1A is for explaining the first principle of this invention. In FIG. 1A, 101 is a microprocessor comprising a main control part 102, a number of wait states setting unit 103 and a wait instruction signal generating unit 104. A wait request signal creating unit 105 is set outside the microprocessor 101. This microprocessor 101 comprises one chip LSI, for example.

Here, a microprocessor is referred to as something whose internal parts comprise LSI's. A microcomputer is composed of internal parts comprising LSI's, and peripheral circuits, which together are generally referred to as a microcomputer system. Other embodiments described later are similarly described later.

The main control part 102 is equivalent to the core part of the microprocessor 101 and comprises such things as a Programmable Logic Array (PLA), an Arithmetic Logic Unit (ALU) and a random logic. It processes a necessary operation and outputs a bus control signal, input/output data, an output address, and an address strobe signal, e.g., to a peripheral device. The bus control signal includes a Read/Write signal, etc., whose line numbers are x, y and z, for instance.

The wait instruction signal generating unit 104 inputs a wait instruction signal to the main control part 102 at a predetermined timing. While the wait instruction signal indicates a wait instruction, the main control part 102 has a bus control function for inserting a wait state in the current bus cycle and for extending the output state such as the bus control signal, the input/output data and the output address.

The number of wait states setting unit 103 and the wait instruction signal generating unit 104 operates in synchronization with an operating clock of the main control part 102. The number of wait states setting unit 103 (such as a register) can programmably set the wait number to which the wait number is written according to a register write order from the main control part 102.

The wait instruction signal generating unit 104 is a circuit for receiving a wait request signal inputted from the outside of the microprocessor 101 and for detecting a wait request trigger of the wait request signal. It samples a wait request signal at a predetermined timing. If the sampling result shows a signal indicating a wait request, the wait instruction signal generating unit 104 generates a wait instruction signal that causes the bus cycle of the main control part 102 to wait for a period according to the number of wait states and sends the wait instruction signal to the main control part 102.

The wait instruction signal generating unit 104 can be a circuit for detecting a special signal (such as a rising edge or a falling edge) indicating the wait beginning of the wait request signal and for generating a wait instruction signal that causes the bus cycle of the main control part 102 to wait by the number of wait states, if the signal indicates a wait request.

Figure 8:
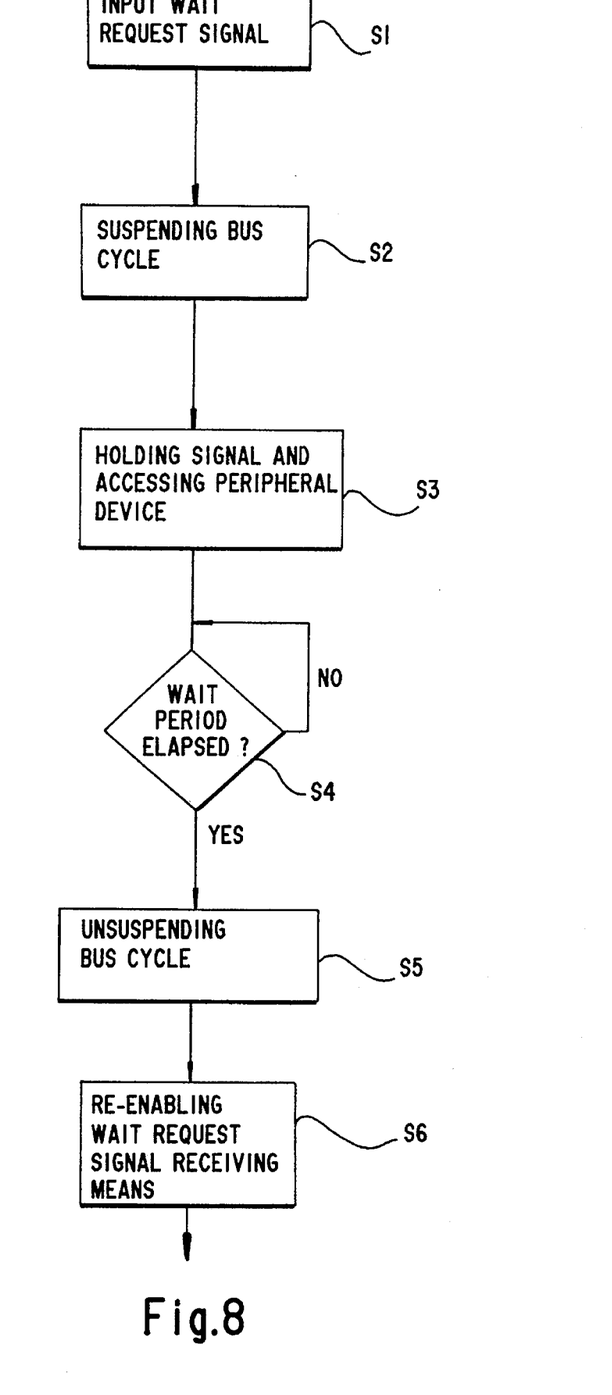
FIG. 8 is a flowchart showing the suspension of the bus cycle of the microprocessor in the present invention.

As shown in FIG. 8, the wait request signal creating unit 105 outputs the wait request signal. When the main control part 102 makes an access request to its peripheral device, the wait request signal creating unit 105 detects it as a trigger condition of the wait request signal, creates a wait request signal and sends it to the wait instruction signal generating unit 104 as shown in step S1.

In the above configuration, the microprocessor 101 processes operations at a predetermined bus cycle. After a predetermined time has elapsed since the microprocessor 101 outputs an access request for accessing its peripheral device, the wait instruction signal generating unit 104 samples the wait request signal or detects a wait request beginning (such as an edge) of the wait request signal. If the detected signal indicates a wait request, the wait instruction signal generating unit 104 counts up the counter in the wait instruction signal generating unit 104 one by one to a certain wait state contemporaneously with making a wait instruction by causing the main control part 102 to activate the wait instruction signal (a signal triggering a wait) at a predetermined timing. During this period, the bus cycle is caused to wait, as shown in step S2 and the microprocessor 101 accesses its low-speed peripheral device, as shown in step S3. After it is determined that the predetermined wait period has elapsed in step S4, the microprocessor 101 unsuspends the bus cycle in step S5 and reenables the wait request signal receiving capability of the microprocessor in step S6.

The predetermined time is allowed to elapse as above because the operating clock of the microprocessor 101 determines the predetermined time after an address output, so that an output address from the microprocessor 101 is finalized and the wait request signal creating unit 105 can stably output a wait request signal during the predetermined period.

When the counter reaches the number of wait states, the wait instruction signal generating unit 104 deactivates the wait instruction signal (a signal clearing a wait) and clears the wait in the main control part 102. The wait instruction signal generating unit 104 does not need to sample the wait request signal while the main control part 102 is waiting.

Meanwhile, the wait request signal creating unit 105 outputs a wait request signal to a wait request input terminal (not shown in the drawing) of the microprocessor 101. It creates this signal by selecting the address to be caused to wait from the output addresses of the microprocessor 101, for example. In this case, the wait request signal creating unit 105 does not need to select an address at a particular timing. It can receive a control signal from another source to be used as processing information for creating a wait request signal.

Consequently, as described above, after the main control part 102 receives a wait request, since the microprocessor 101 automatically causes the bus cycle to wait for a period corresponding to the number of wait states set in the number of wait states setting unit 103, an external circuit for creating the wait request signal can be formed of a generic address decoding circuit for selecting the address to be caused to wait from the addresses outputted from the microprocessor 101. Accordingly, a timing for wait requesting or clearing is no longer necessary, and the circuits of both the external circuit for the wait control of the microprocessor 101 and the internal circuit of the microprocessor 101 can be simplified, thereby realizing a microprocessor with a low-cost automatic wait control.

FIG. 1B explains a second principle of this invention. It is different from FIG. 1A in that many peripheral devices 6 are provided and the wait request signal creating unit 105 receives a chip-select signal from one of the peripheral devices 6 as the wait request signal and detects a wait request trigger of the wait request signal.

The peripheral devices 6, such as a Random Access Memory (RAM), a Read Only Memory (ROM), a communication LSI or an image control LSI, have a slower operating speed than the microprocessor 101, and a chip-select signal CS selects one chip. The wait request signal creating unit 105 outputs a chip-select signal to one of the peripheral devices 6 by selecting a signal (such as an output address) from the main control part 102. In this embodiment, a chip-select signal is commonly used as a wait request signal. The wait request signal creating unit 105 outputs the chip-select signal to the number of wait states setting unit 103 as the wait request signal.

Accordingly, when the microprocessor 101 outputs a signal for accessing the peripheral device 6, the wait request signal creating unit 105 selects one of the peripheral devices 6 to be caused to wait and outputs the select result signal to the wait request input terminal (not shown in the drawing) of the microprocessor 101 as the wait request signal. Thus, the chip-select signal selects the appropriate peripheral device 6. In this way, a chip-select signal is commonly used to eliminate the need for a timing for wait request or a clearing, thereby simplifying both the external circuit for a wait control and the internal circuit and realizing a microprocessor with a low-cost automatic wait control.

FIG. 1C explains a third principle of this invention. It is different from FIG. 1B in that an address selector 5 is provided in lieu of the wait request signal creating unit 105.

In this embodiment, the address selector 5 outputs a chip-select signal to one of the peripheral devices 6 and selects an output address from the main control part 102. The address selector 5 also outputs the chip-select signal to the number of wait states setting unit 103 as a wait request signal.

Accordingly, the address selector 5 judges whether the microprocessor 101 outputs an output address for accessing the peripheral device 6, selects an address to be caused to wait, and outputs the select result signal to the wait request input terminal (not shown in the drawing) of the microprocessor 101 as the wait request signal. Thus, an external circuit for creating a wait request signal can be formed of a generic address decode circuit for selecting an address to be caused to wait from the addresses outputted from the microprocessor 101. As a result, a wait request or a clearing is no longer necessary, thereby simplifying both the external circuit for a wait control of the microprocessor 101 and the internal circuit of the microprocessor 101 and realizing a microprocessor with a low-cost automatic wait control.

More concrete descriptions of the preferred embodiments are illustrated by the drawings, as follows.

FIRST EMBODIMENT

Figure 2:
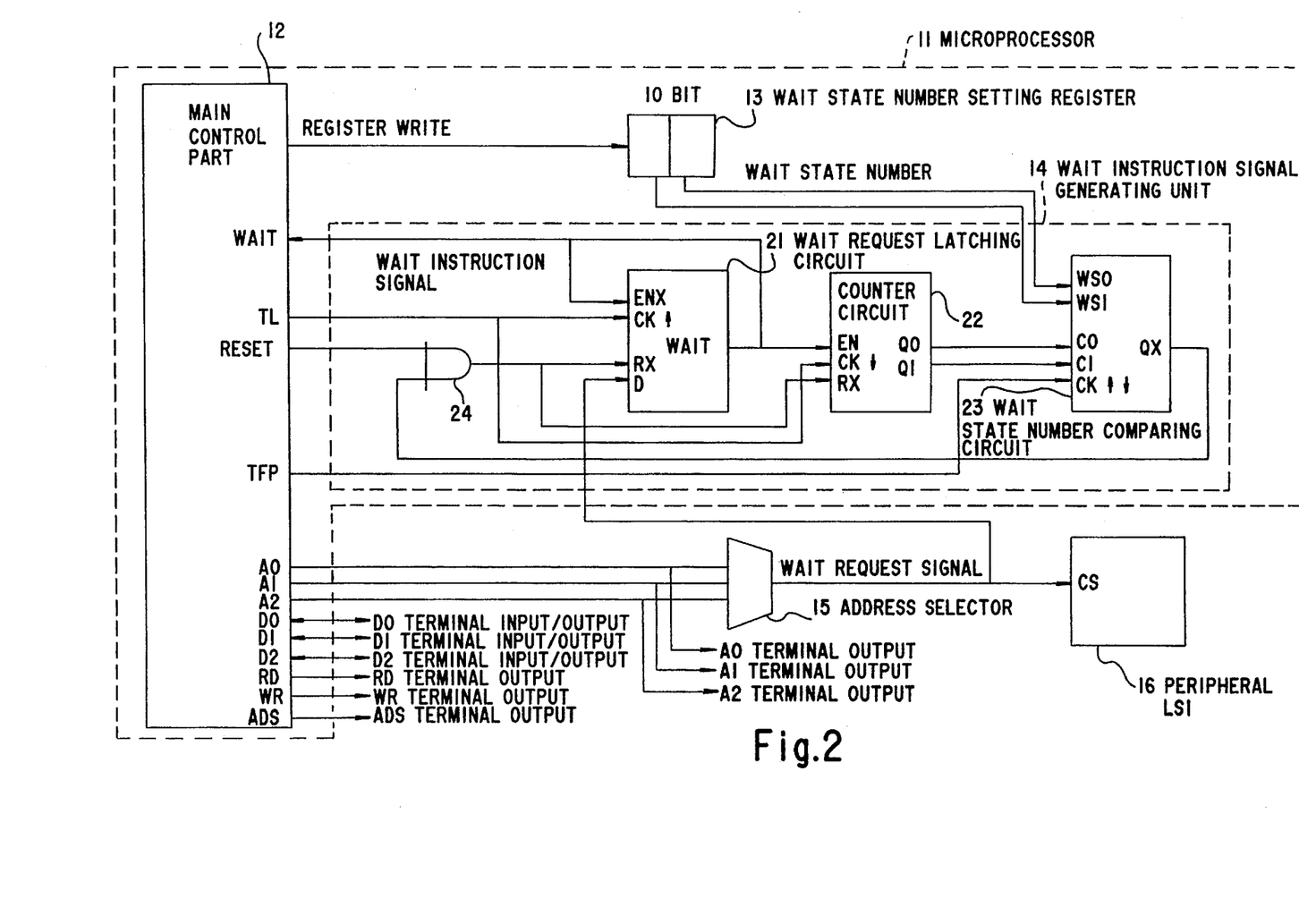
FIG. 2 is a circuit diagram and FIG. 3 is a timing chart.
Figure 3:
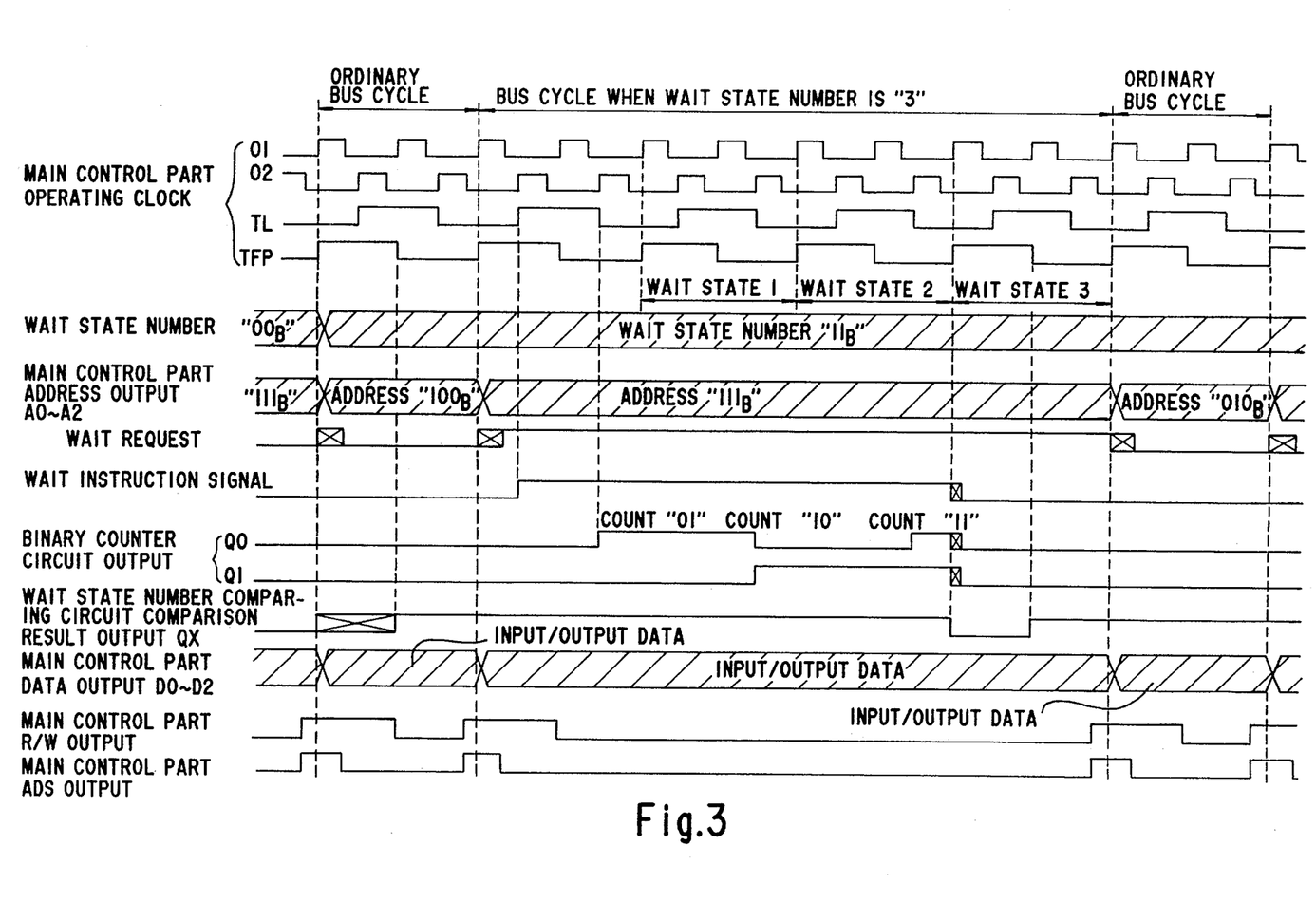

FIGS. 2 and 3 show the first embodiment of the microcomputer and its bus cycle control method according to the present invention.

FIG. 2 is a circuit diagram in which 11 is a microprocessor, 12 is a main control part, 13 is a number of wait states setting register (equivalent to the number of wait states setting unit), 14 is a wait instruction signal generating part (equivalent to the wait instruction signal generating unit), 15 is an address selector circuit, and 16 is a peripheral device.

The microprocessor 11 comprises the main control part 12, the number of wait states setting register 13 and the wait instruction signal generating part 14.

The main control part 12 samples the wait instruction signal at a timing of a falling edge of a clock TL, and has a bus control function for extending the bus cycle by one wait state when a sampling result indicates "1". (This embodiment assumes that one state is equal to one bus-cycle period.) The main control part 12 processes one phase of a clock TFP as one bus cycle, and outputs addresses A0, A1 and A2; data D0, D1 and D2; and a bus control signal such as a data reading signal RD, a data writing signal WR, and an address strobe signal ADS, at a timing of a rising edge of the clock TFP. The main control part 12 outputs that the reset sitnal RESET is "0" when the microprocessor 11 is being reset and that the reset signal RESET is "1" after the reset is cleared.

The number of wait states setting register 13 sets the number of wait states from the main control part 12 or from the outside. It sets all initial values to "0" after the reset is cleared. In this embodiment, nothing is caused to wait if all initial values are "0".

The wait instruction signal generating part 14 comprises a wait request latching circuit 21, a binary counter circuit 22, a number of wait states comparing circuit 23 and an "AND" gate 24.

When the input level of a reset (RX) is "1" and the input level of a latch enabling signal (ENX) is "0", the wait request latching circuit 21 latches a wait request signal supplied from a terminal D at a timing of a rising edge of the clock TL, and outputs the latching result to the main control part 12 from an output (WAIT). When the input level of the latch enabling signal (ENX) is "1", the wait request latching circuit 21 does not latch, but retains the previously latched value. When the input level of the reset (RX) is "0", the wait request latching circuit 21 outputs "0" at an RX input timing (plus the elapsed gate time).

When the input level of a reset (RX) is "1" and the input level of a count enabling signal (EN) is "0", the counter circuit 22 outputs count-up outputs (Q1, Q0) at a timing of a falling edge of the clock TL. When the input level of the reset (RX) is "0", the counter circuit 22 outputs "0" at the RX input timing (plus the elapsed gate time). When the input level of the count enabling signal (EN) is "0", the counter circuit 22 does not count, but retains the previously latched value.

The number of wait states comparing circuit 23 compares signals WS0 with C0, and WS1 with C1 from the number of wait states setting register 13 at a timing of a rising or falling edge of the clock TFP. If the two pairs agree, the number of wait states comparing circuit 23 sets the output QX to "0" and outputs it to the "AND" gate 24. If the two pairs do not agree, the number of wait states comparing circuit 23 sets the output QX to "1" and outputs it to the "AND" gate 24. When the output QX is "0", the "AND" gate 24 sends a signal RESET to the wait request latching circuit 21.

The address selector circuit 15 may select any of the addresses A0, A1 and A2 outputted from the microprocessor 11. In the present embodiment, the address selector circuit 15 comprises an "AND" gate that outputs "1" when A0, A1 and A2 are all "1".

Actual operations according to this configuration are explained by referring to FIG. 3 which is a timing chart.

Because initial values of the number of wait States comparing circuit 23 and the number of wait states setting register 13 are all "0" after the microprocessor 11 is reset, the output QX from the number of wait states comparing circuit 23 becomes "0", and both the wait request latching circuit 21 and the counter circuit 22 are reset. Hence, until any value other than "$00_B$" is set in the number of wait states setting register 13 after the microprocessor 11 is reset, the output QX of the number of wait states comparing circuit 23 remains "0" and each circuit is kept reset. Thus, the wait instruction signal for the microprocessor 11 becomes a deactivating (wait clearing) signal.

If "$11_B$" is set to the number of wait states register 13 after reset clearing of the microprocessor 11, the input value "$00_B$" (C1, C0) from the counter circuit 22 does not agree with the input value "$11_B$" (WS1, WS0) from the number of wait states setting register 13 at the number of wait states comparing circuit 23. Thus, the wait state number register 13 outputs "1" as a result of comparing the timing of the rising or falling edges of the clock TFP. Consequently, the resetting of the wait request latching circuit 21 and the counter circuit 22 are cleared (RX input is set to "1"), and the wait request latching circuit 21 becomes capable of latching the wait request at a predetermined timing and counter circuit 22 becomes capable of performing a count-up operation.

If an address signal is concurrently outputted from the microprocessor 11 to the peripheral device 16, it is detected as a wait request signal by the address selector circuit 15. That is, only when the addresses A0, A1 and A2 outputted from the main control part 12 are "$111_B$" does the address selector circuit 15 output "1" and a wait request for the microprocessor 11. Here, the output level of the wait request signal is assumed to be finalized at a latching, since the wait request latching circuit 21 latches the wait request signal at a timing of a rising edge of the clock TL. In other words, the addresses A0, A1 and A2 outputted from the main control part 12 are assumed to be finalized sufficiently in advance of the rising of the clock TL (to allow time for signal propagation delays due to, e.g., gate delay and wiring capacitance).

Thus, the wait request latching circuit 21 latches a wait request signal "1" at a timing of a rising edge of the clock TL and outputs it to the main control part 12 as a wait instruction signal.

Since the latched signal is "1", the main control part 12 latches the wait instruction signal at a falling of the clock TL and inserts one wait state into the next bus cycle. The wait instruction signal is also inputted to the counter circuit 22 as its count enabling signal (EN). The counter circuit 22 is counted up at a falling timing of the clock TL when the wait instruction signal is "1", and the output changes from "$00_B$" to "$01_B$".

The number of wait states comparing circuit 23 compares the input value "$01_B$" (C1, C0) from the counter circuit 22 with the input value "$11_B$" (WS1, WS0) at a rising or falling timing of the clock TFP. Due to the non-agreement, however, the output QX remains "1", and the wait request latching circuit 21 continues to output the wait instruction signal "1" (the wait request) to the main control part 12.

Then, the wait request latching circuit 21 outputs the wait instruction signal "1" to the main control part 12, until the counter circuit 22 is counted up at a timing of a falling edge of the clock TL, and their outputs Q1 and Q0 change from "$00_B$" through "$01_B$" and "$10_B$" to "$11_B$", and finally match the value of the number of wait states "$11_B$" and the number of wait states comparing circuit 23 outputs "0" (agreement) as a comparing result. Thereafter, since the wait request latching circuit 21 and the counter circuit 22 are reset (RX input is "0") when the number of wait states comparing circuit 23 outputs "0" (agreement), the wait instruction signal becomes "0" and the main control part 12 ceases to insert a wait state from the next bus cycle.

To summarize, the chip-select signal selected in the address selector circuit 15 enables wait states of the numbers set by the number of wait states setting register 13 to be inserted into the bus cycle. Therefore, as stated earlier, both the external circuit necessary for the wait control of the microprocessor 101 and the internal circuit of the microprocessor 101 can be simplified, thus realizing a microprocessor 11 with a low-cost automatic wait control.

SECOND EMBODIMENT

Figure 4:
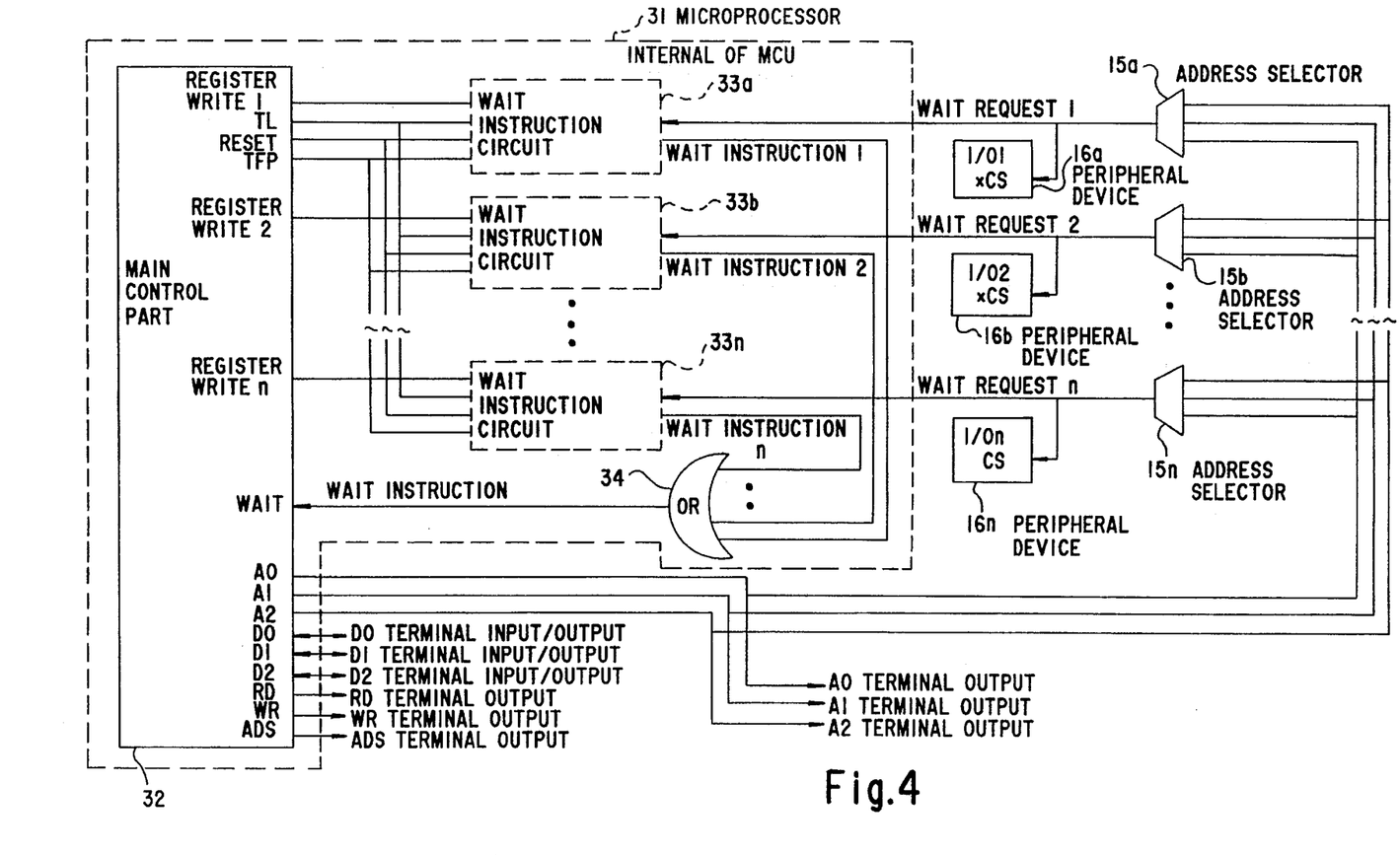
FIG. 4 shows circuit diagram of the microcomputer and illustrates the bus cycle control method according to the second embodiment of this invention.

FIG. 4 is a circuit diagram showing of the second embodiment of this invention, in which a plurality (n pieces) of peripheral devices 16a through 16n and their corresponding address selector circuits 15a through 15n are provided. The address selector circuits 15a through 15n detect a chip-select signal outputted from a main control part 32 corresponding to peripheral devices 16a through 16n as wait request signals 1 through n, and output the results to the corresponding wait instruction circuits 33a through 33n. That the address selector circuits 15a through 15n output chip-select signals to the corresponding peripheral devices 16a through 16n.

The wait instruction circuits 33a through 33n (equivalent to the number of wait states setting units and wait instruction signal generating means) each comprise a number of wait states setting register, a wait request latching circuit, a counter circuit and a number of wait states comparing circuit. An "OR" gate 34 sums, by "OR" logic, all signals outputted from the wait instruction circuits 33a through 33n. Signal prioritization, according to the description of the second embodiment, is achieved through prioritization of wait states which is not achieved using OR logic alone. Since each of the wait instructions circuits has a counter circuit and a number-of-wait-states comparing circuit, the wait instruction circuit which has the highest count will generate the longest duration wait instruction signal from the comparing circuit. All of the wait instructions are input into a common OR gate. Once the OR gate has been activated and remains activated, a main control part 32 will remain in a wait state since it is receiving a wait instruction. The register with the highest count will continue to hold that wait state and will continue to receive priority because no additional wait states can have an effect on the OR gate and therefore cannot interrupt the wait priority control of the main control part 32. This is in FIG. 4. The wait instruction circuit with the highest count therefore will hold the OR gate in an active position effectively blocking activation of the OR gate by any additional wait instruction until the time-out period of the counter circuit. Signals are thus prioritized by effectively blocking any shorter term wait state requests, which will have expired due to their counter circuit reaching full count prior to relinquishment of the OR gate by the highest count, i.e., highest prioritized, wait instruction circuit.

Thus, when a plurality of wait requests are simultaneously generated in a microprocessor 31, the one with the largest number of wait states among the corresponding number of wait states setting register is prioritized. Clearly, this embodiment can achieve an effect similar to that of the first embodiment.

THIRD EMBODIMENT

Figure 5:
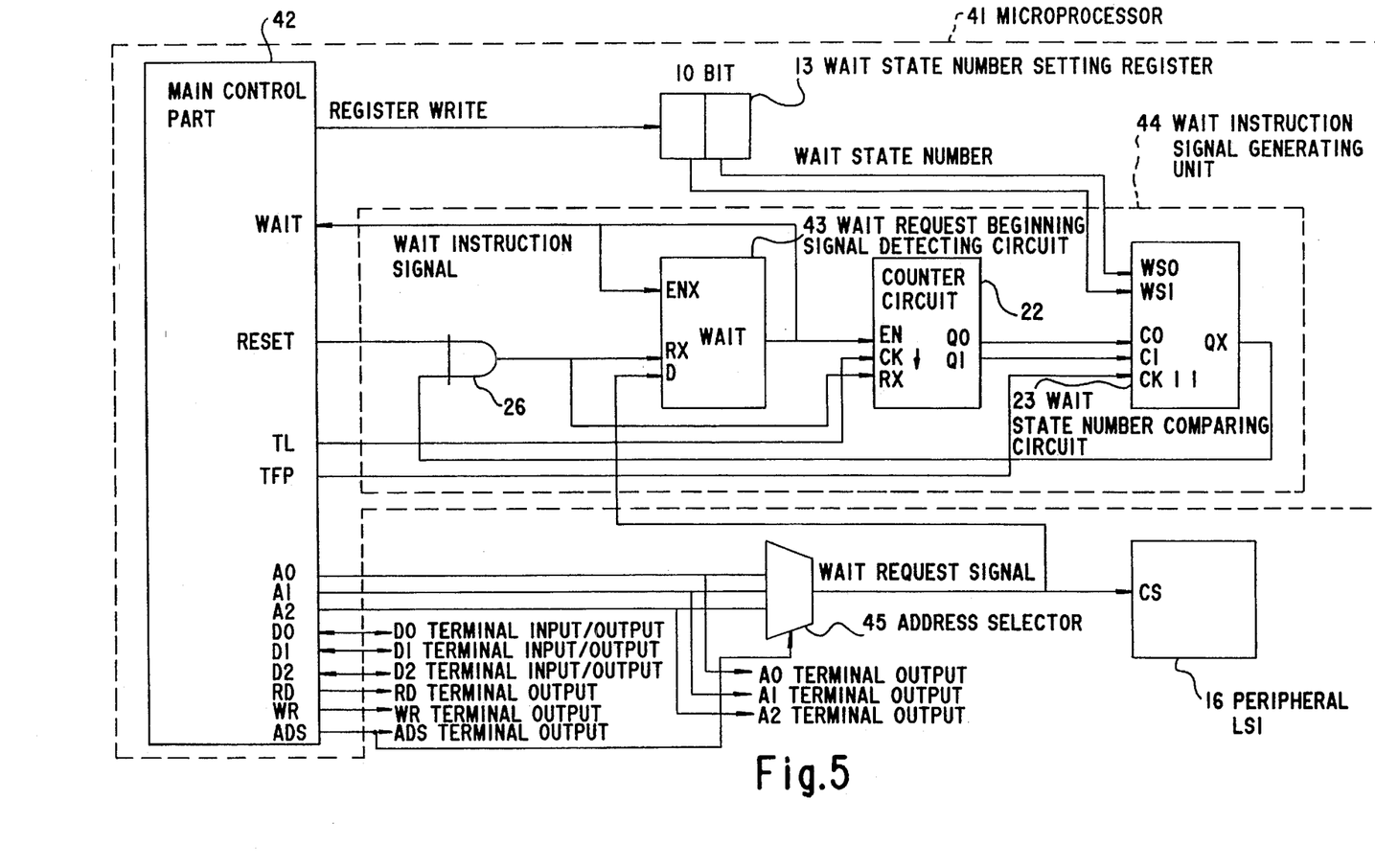
FIG. 5 is its circuit diagram and FIG. 6 is its timing chart.
Figure 6:
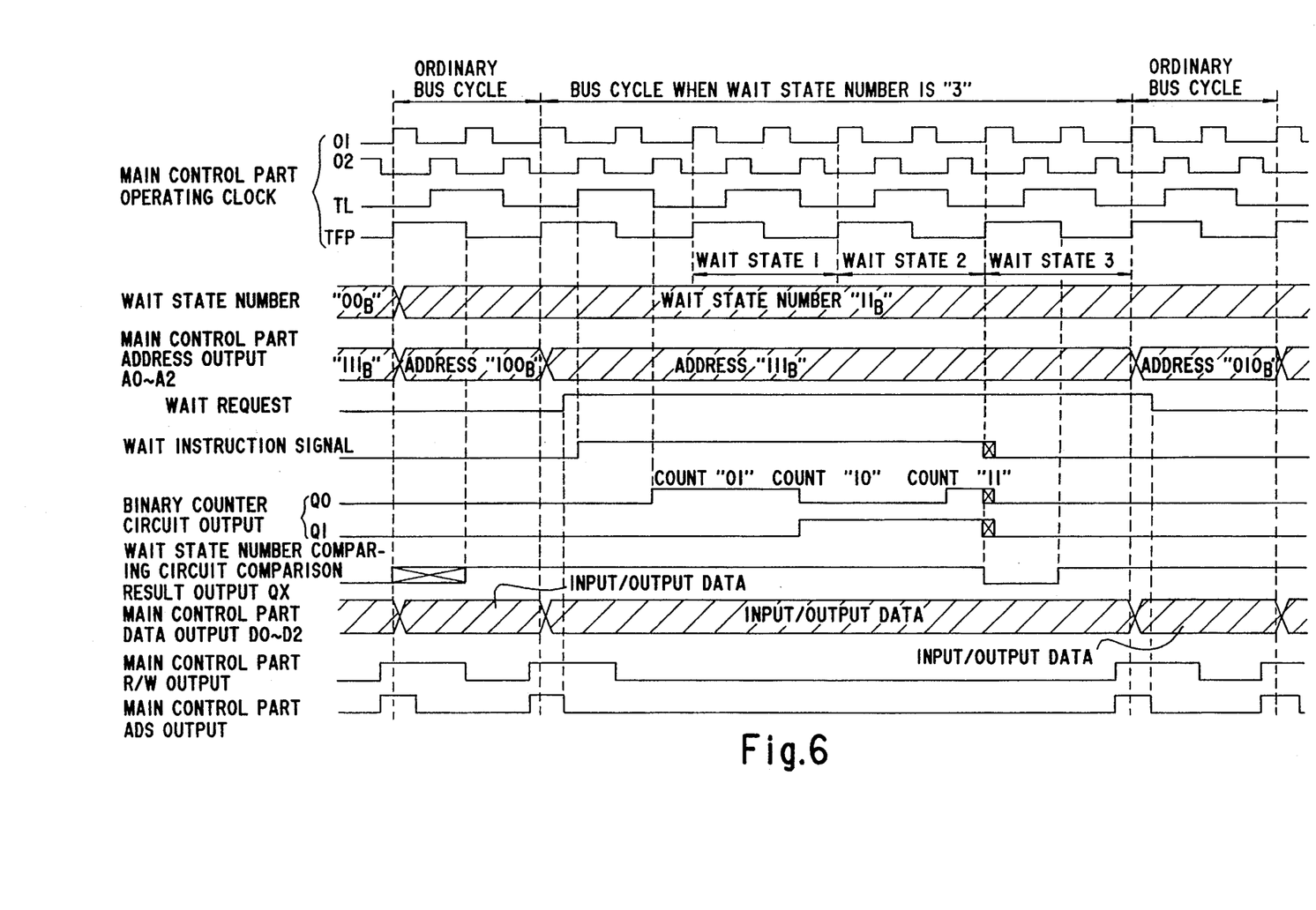

FIGS. 5 and 6 illustrate the third embodiment of this invention.

FIG. 5 is its circuit diagram. This differs from the first embodiment in that a wait request beginning signal detecting circuit 43 replaces the wait request latching circuit and an address selector circuit 45 is changed to output a wait request signal in synchronization with a timing of a falling edge of an ADS signal (address strobing signal) outputted from a microprocessor 41. 42 is a main control part and 44 is a wait instruction signal generating part.

FIG. 6 is a timing chart. The wait request beginning signal detecting circuit 43 is a widely known rising edge detecting circuit for detecting a change of a wait request from "0" to "1". (It can be a falling edge detecting circuit, if the wait request signal changes from "1" to "0".) When the input level of the reset signal (RX) is "1" and that of the edge detection enabling signal (ENX) is "0", a rising edge detection of the wait request beginning signal begins. When a rising edge is actually detected, the wait request beginning signal detecting circuit 43 outputs "1" (for waiting). When the edge detection enabling signal is "1", a rising edge detection of the wait request beginning signal does not begin and the last value of the edge detection is retained. Meanwhile, when the input level of the reset signal (RX) is "0", the wait request beginning signal detecting circuit 43 outputs "0" at an RX input timing.

Since the wait request beginning signal detecting circuit 43 is an edge detecting circuit, an address selector circuit 45 needs to output a wait request beginning signal to the microprocessor 41. As in the first embodiment, this signal does not have a period in which the wait request signal is not finalized. Hence, the address selector circuit 45 outputs a wait request signal in synchronization with an address strobing signal (ADS) that indicates that the microprocessor 41 guarantees a finalized address output.

Thus, this present embodiment realizes a microprocessor with an automatic wait control with a similar effect to those of the earlier embodiments, even if a wait is requested for the microprocessor at the edge of the signal.

FOURTH EMBODIMENT

Figure 7:
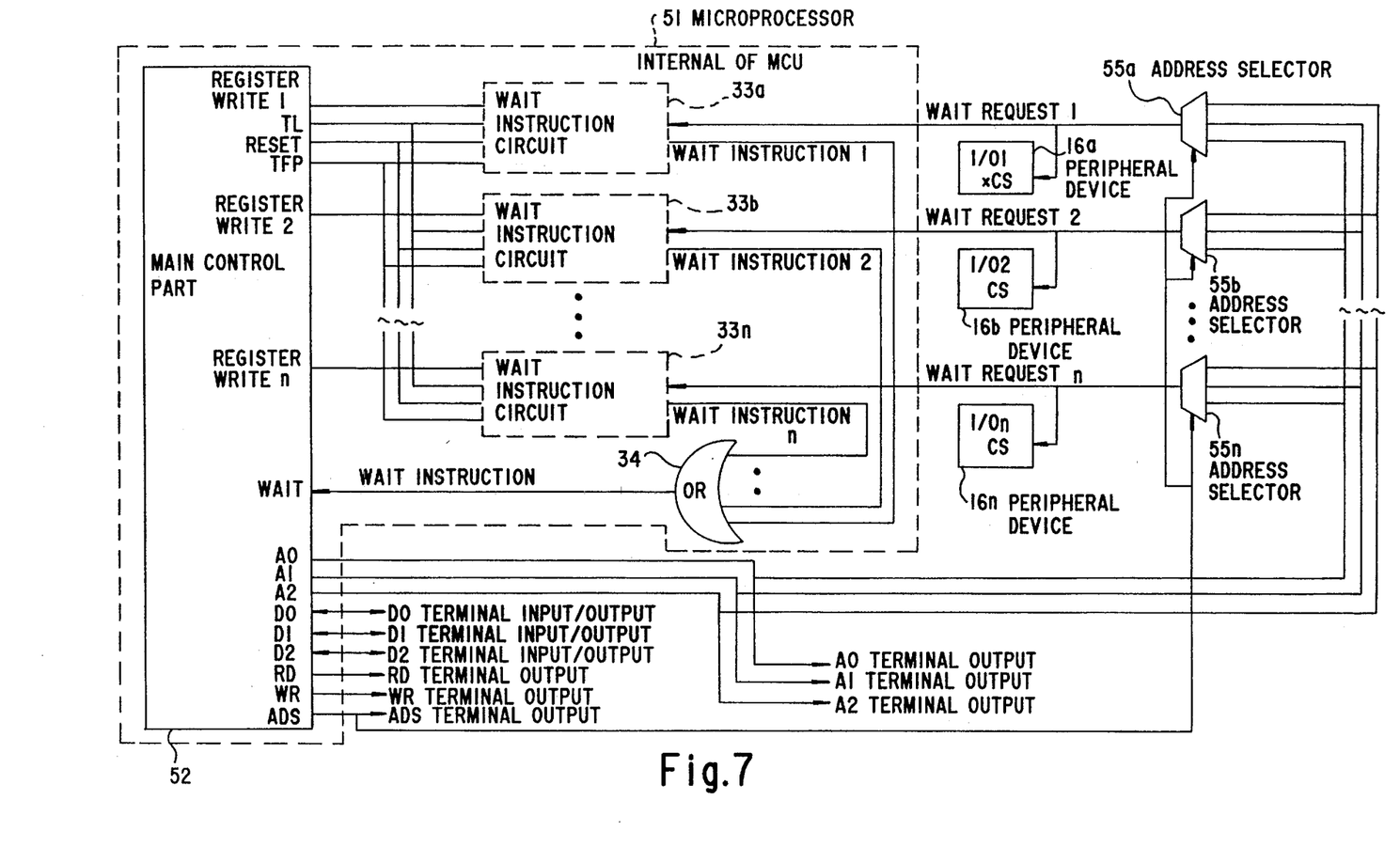
FIG. 7 shows a circuit diagram of the microcomputer and illustrates the bus cycle control method according to the fourth embodiment of this invention.

FIG. 7 is a circuit diagram of the fourth embodiment of this invention, in which a plurality (n pieces) of peripheral devices 16a through 16n and their corresponding address selector circuits 55a through 55n are provided, as in the second embodiment. The address selector circuits 55a through 55n differ from the address selector circuits 15a through 15n shown in the second embodiment in that they are changed to output chip-select signals in synchronization with a timing of a falling edge of an address strobing signal (ADS) outputted from a microprocessor 51 to the peripheral devices 16a through 16n. 52 is a main control part.

This present embodiment realizes effects similar to those of the earlier embodiments, even when the signal requesting a wait to the microprocessor 51 is an edge and there are a plurality of peripheral devices 16a through 16n.

The present invention produces a wait instruction signal upon receiving a wait request signal transmitted from an address selector provided outside the main control part. When various circuits themselves provided in the main control part need to perform the predetermined cycles of wait, a pseudo chip select signal may be caused to provide to the peripheral circuit apparatus thereby enabling the peripheral circuit apparatus to produce a wait signal. In this case, the peripheral circuit apparatus which receives the pseudo chip select signal performs an ordinary operation but the main control part does not utilize the data transmitted from the peripheral circuit apparatus. Therefore, the pseudo wait signal can be produced by using a software program and then the main control part can produce a wait signal without using its own soft counter.

A microprocessor starts a wait control only when a wait request signal from a wait request input terminal is in a wait trigger condition. Therefore, in performing an automatic wait control, this invention enables a greatly simplified circuit compared with a microprocessor loaded with a conventional automatic wait control. Also, a chip-select signal created by an external circuit can be used "as is" as a microprocessor wait request signal, so a complicated timing for requesting or clearing a bus cycle wait to the microprocessor is no longer necessary. Thus, the external circuit can be greatly simplified. Thus, this embodiment realizes a microprocessor with a low-cost automatic wait control.

What is claimed is:

1. A data processing device comprising:

a control part for processing data and communicating with one of a plurality of peripheral devices during a bus cycle;

a plurality of registers, each register being connected to said control part for storing data which designates a length of a wait period; and a plurality of wait circuits, each wait circuit suspending said bus cycle in response to a wait request signal and maintaining the bus cycle suspension regardless of a succeeding wait signal by outputting a wait instruction signal, "OR" logic means, having said wait instruction signals of each wait circuit as inputs and having an output to said control part; wherein said data processing device holds a signal to be applied to one of the plurality of peripheral devices accessed during said wait period, and resumes said bus cycle after a lapse of said wait period.

2. The microprocessor according to claim 1 wherein said control part, said wait circuit, and said register are provided in an Large Scale Integrated chip.

3. A data processing device comprising:

a control part for processing data and communicating with one of a plurality of peripheral devices during a bus cycle and for outputting chip select signals;

a plurality of registers, each register being connected to said control part for storing data which designates a length of a wait period;

a plurality of wait circuits, each wait circuit suspending the bus cycle in response to a wait request signal and maintaining the bus cycle suspension regardless of a succeeding wait signal by outputting a wait instruction signal; and a plurality of address selectors, for detecting each chip-select signal outputted from the control part in correspondence with said plurality of the peripheral devices as wait request signals and for outputting the results to a corresponding wait circuit;

"OR" logic means, having said wait instruction signals of each wait circuit as inputs and having an output to said control part; wherein said data processing device holds a signal to be applied to one of said plurality of peripheral devices during said wait period, and resumes said bus cycle after a lapse of said wait period.

4. The data processing device according to claim 3 wherein said data processing device prioritizes a wait request from a peripheral device having a largest number of wait states provided in the register when a plurality of the peripheral devices simultaneously generate wait requests to the control part.

5. A microcomputer comprising:

a microprocessor for processing operations in a predetermined bus cycle; and an address selector for detecting a chip-select signal outputted from a control part to peripheral devices as a wait request signal provided outside and connected to said microprocessor; wherein said peripheral devices connected to and accessible by the microprocessor include a control part for processing operations and generating access control signals to its peripheral devices;

state number setting means connected to said control part for storing data which designates a length of a wait period;

a plurality of wait circuits connected to said state number setting means generating a wait instruction signal in response to a wait request signal;

means for causing the bus cycles in said control part to wait for a period corresponding to the state number provided by said state number setting means including "OR" logic means, having the wait instruction signals from each of said plurality of wait circuits as inputs and having an output to said control part; and means for holding a signal to be applied to one of a plurality of peripheral devices accessed during said wait period and resuming said bus cycle after a lapse of said wait period.

6. A microcomputer comprising:

a microprocessor for processing operations in a predetermined bus cycle including:

a control part for processing operations and generating access control signals to peripheral devices;

state number setting means connected to said control part for storing data which designates a length of a wait period;

a plurality of wait circuits connected to said state number setting means, generating a wait instruction signal in response to a wait request signal;

a plurality of address selectors for detecting each access control signal outputted from the control part corresponding to one of said plurality of the peripheral devices as a wait request signal and for outputting results to a corresponding wait circuit;

means for causing the bus cycle in said control part to wait for a period corresponding to a state number provided by said state number setting means including "OR" logic means, having the wait instruction signals from each of said plurality of wait circuits as inputs and having an output to said control part;

means for holding a signal to be applied to one of a plurality of peripheral devices accessed during said wait period and resuming said bus cycle after a lapse of said wait period.

* * * * *